United States Patent
Soldati

(10) Patent No.: US 10,159,026 B2
(45) Date of Patent: Dec. 18, 2018

(54) METHODS AND NETWORK NODES IN A WIRELESS COMMUNICATION NETWORK

(71) Applicant: Huawei Technologies Co., Ltd., Shenzhen (CN)

(72) Inventor: Pablo Soldati, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 131 days.

(21) Appl. No.: 15/242,214

(22) Filed: Aug. 19, 2016

(65) Prior Publication Data

US 2016/0360454 A1 Dec. 8, 2016

Related U.S. Application Data

(63) Continuation of application No. PCT/EP2014/053470, filed on Feb. 21, 2014.

(51) Int. Cl.
| | |
|---|---|
| *H04W 36/08* | (2009.01) |
| *H04W 48/12* | (2009.01) |
| *H04W 76/28* | (2018.01) |
| *H04W 88/02* | (2009.01) |
| *H04W 88/08* | (2009.01) |

(52) U.S. Cl.
CPC .......... *H04W 36/08* (2013.01); *H04W 48/12* (2013.01); *H04W 76/28* (2018.02); *H04W 88/02* (2013.01); *H04W 88/08* (2013.01)

(58) Field of Classification Search
None
See application file for complete search history.

(56) References Cited

U.S. PATENT DOCUMENTS

| 2003/0117969 A1* | 6/2003 | Koo | H04B 7/2637 |
| | | | 370/318 |
| 2012/0322445 A1 | 12/2012 | Kwon et al. | |
| 2014/0171073 A1* | 6/2014 | Kim | H04W 24/10 |
| | | | 455/434 |

(Continued)

FOREIGN PATENT DOCUMENTS

| EP | 3101961 A1 | 12/2016 |
| JP | 2012518327 A | 8/2012 |

(Continued)

OTHER PUBLICATIONS

"Small cell enhancements—physical layer aspects—core part", Huawei, CATR, HiSilicon, 3GPP TSG RAN Meeting #62, Dec. 3-6, 2013, 7 pages, RP-132073.

(Continued)

*Primary Examiner* — James P Duffy

(57) ABSTRACT

A first network node provides timing information of at least one other network node, operating in discontinuous transmission mode, for enabling a mobile station to monitor the at least one other network node. The first network node comprises a transmitter, configured for transmitting a signal comprising timing information, associated with a state switch between dormant state and active state of the at least one other network node and/or associated to a monitoring operation of the at least one other network node to be received by the mobile station. Also, a mobile station configured for monitoring the at least one other network node is disclosed.

18 Claims, 9 Drawing Sheets

(56) References Cited

U.S. PATENT DOCUMENTS

| | | | |
|---|---|---|---|
| 2014/0199999 A1* | 7/2014 | Hakola | H04W 8/005 455/435.1 |
| 2014/0254538 A1 | 9/2014 | Park et al. | |
| 2015/0003312 A1* | 1/2015 | Jeong | H04W 52/0235 370/311 |
| 2015/0289214 A1 | 10/2015 | Frenger et al. | |
| 2016/0360478 A1 | 12/2016 | Malladi et al. | |
| 2017/0006570 A1 | 1/2017 | Xu et al. | |

FOREIGN PATENT DOCUMENTS

| | | |
|---|---|---|
| JP | 2015537456 A | 12/2015 |
| WO | 2013163570 A1 | 10/2013 |
| WO | 2014022806 A3 | 2/2014 |
| WO | 2014071967 A1 | 5/2014 |

OTHER PUBLICATIONS

"Small cell enhancements—physical layer aspects—Feature", Huawei, CATR, HiSilicon, 3GPP TSG RAN Meeting #62, Dec. 3-6, 2013, 5 pages, RP-132073.

"Small cell enhancements—physical layer aspects—performance part", Huawei, CATR, HiSilicon, 3GPP TSG RAN Meeting #62, Dec. 3-6, 2013, 5 pages, RP-132073.

"3rd Generation Partnership Project; Technical Specification Group Radio Access Network; Evolved Universal Terrestrial Radio Access (E-UTRA); Requirements for support of radio resource management (Release 11)", 3GPP TS 36.133 V11.1.0, Jun. 2012, 639 pages.

"3rd Generation Partnership Project; Technical Specification Group Radio Access Network; Small cell enhancements for E-UTRA and E-UTRAN—Physical layer aspects (Release 12)", 3GPP TR 36.872 V12.1.0, Dec. 2013, 100 pages.

Gunther Auer et al., "Energy efficiency analysis of the reference systems, areas of improvements and target breakdown", Earth Project, Dec. 31, 2010, 68 pages.

Laetitia Falconetti et al., "Energy Efficiency in Heterogeneous Networks", IEEE Online Conference on Green Communications (GreenCom), 2012, p. 98-103.

"Enhancements of RRM measurements for small cell on/off", Huawei, HiSilicon, 3GPP TSG RAN WG1 Meeting #76, Feb. 10-14, 2014, 4 pages, R1-140038.

"Small cell on/off time reduction", Qualcomm Incorporated, 3GPP TSG-RAN WG1 #76, Feb. 10-14, 2014, 5 pages, R1-140452.

* cited by examiner

METHODS AND NETWORK NODES IN A WIRELESS COMMUNICATION NETWORK

CROSS-REFERENCE TO RELATED APPLICATIONS

This application is a continuation of International Application No. PCT/EP2014/053470, filed on Feb. 21, 2014, which is hereby incorporated by reference in its entirety.

TECHNICAL FIELD

Implementations described herein generally relate to a first network node, a method in a first network node, a mobile station and a method in a mobile station. In particular, a mechanism is herein described, for enabling the mobile station to monitor at least one other network node, operating in discontinuous transmission mode.

BACKGROUND

A mobile station, also known as a User Equipment (UE), wireless terminal and/or mobile terminal is enabled to communicate wirelessly in a wireless communication network, sometimes also referred to as a cellular radio system. The communication may be made, e.g., between user equipment, between a user equipment and a wire connected telephone and/or between a user equipment and a server via a Radio Access Network (RAN) and possibly one or more core networks. The wireless communication may comprise various communication services such as voice, messaging, packet data, video, broadcast, etc.

The mobile station may further be referred to as mobile telephone, cellular telephone, computer tablet or laptop with wireless capability, etc. The mobile station in the present context may be, for example, portable, pocket-storable, hand-held, computer-comprised, or vehicle-mounted mobile devices, enabled to communicate voice and/or data, via the radio access network, with another entity, such as another mobile station, a stationary entity or a server.

The wireless communication network covers a geographical area which is divided into cell areas, with each cell area being served by a network node, radio network node or base station, e.g., a Radio Base Station (RBS) or Base Transceiver Station (BTS), which in some networks may be referred to as "eNB", "eNodeB", "NodeB" or "B node", depending on the technology and/or terminology used.

Sometimes, the expression "cell" may be used for denoting the network node itself. However, the cell may also in normal terminology be used for the geographical area where radio coverage is provided by the network node at a base station site. One network node, situated on the base station site, may serve one or several cells. The network nodes may communicate over the air interface operating on radio frequencies with any mobile station within range of the respective network node.

In some radio access networks, several network nodes may be connected, e.g., by landlines or microwave, to a Radio Network Controller (RNC), e.g., in Universal Mobile Telecommunications System (UMTS). The RNC, also sometimes termed Base Station Controller (BSC), e.g., in GSM, may supervise and coordinate various activities of the plural radio network nodes connected thereto. GSM is an abbreviation for Global System for Mobile Communications (originally: Groupe Special Mobile).

In 3rd Generation Partnership Project (3GPP) Long Term Evolution (LTE), network nodes, which may be referred to as eNodeBs or eNBs, may be connected to a gateway, e.g., a radio access gateway, to one or more core networks. LTE is based on the GSM/EDGE and UMTS/HSPA network technologies, increasing the capacity and speed using a different radio interface together with core network improvements.

LTE-Advanced, i.e. LTE Release10 and later releases are set to provide higher bitrates in a cost efficient way and, at the same time, completely fulfil the requirements set by International Telecommunication Union (ITU) for the International Mobile Telecommunications (IMT)-Advanced, also referred to as 4G.

In the present context, the expressions downlink, downstream link or forward link may be used for the transmission path from the network node to the mobile station. The expression uplink, upstream link or reverse link may be used for the transmission path in the opposite direction, i.e., from the mobile station to the network node.

Densification of radio network nodes is expected to lead to the spectral efficiency requirements envisioned for future radio access networks. However studies have showed that a plain network densification would significantly increase the overall energy costs. Therefore, future generations of dense radio access network should be co-designed to be both spectral- and energy-efficient.

While network nodes in traditional 4G radio cellular systems have been proven to transmit user data-plane about 5% of the subframes, this number may be significantly lower in denser networks, e.g. as low as 1% or less. Therefore, to fulfil both spectral- and energy-efficiency requirements, network nodes in dense networks can be dynamically switched on/off network nodes to follow traffic variations or other relevant network statistics. More practically, the network nodes shall operate in Discontinuous Transmission (DTX) mode, where the network node is active when there is traffic to be served, whilst it transits into a dormant state with limited transmission and reception capabilities otherwise. Thus, with a discontinuous transmission ratio of 1%, for a transmission time of tens to hundreds of milliseconds (e.g., 100 ms) the "off-time" would be in the order of tens of seconds (e.g., 10 s).

Future releases of the related art LTE system, for instance, will adopt this feature for enhanced small cell operation (i.e., network nodes with a small coverage area, sometimes referred to as micro cells, pico cells, nano cells etc.). Typical scenarios may be exemplified by two cases: (a) a macro-cell layer providing large coverage and clusters of small-cell nodes deployed in the same frequency band as the macro-cell layer (i.e., co-channel deployment) or in a disjoint frequency band (i.e. non-co-channel deployment); and (b) isolated clusters of small-cells without macro-coverage. In the first case, the macro-cell (a.k.a. primary cell (P-cell) or serving cell in LTE terminology) may provide network assistance to the mobile stations for operating in the small-cell layer (a.k.a. secondary cells (S-cells)). In the second case, network assistance may be provided by a cluster head as well as coordination among the small-cells operation.

Enabling network nodes to operate with long DTX cycles with very short active time has severe consequences in the efficiency of the cell discovery procedures and the relative energy consumption at the mobile station. The cell-search procedure of the related art 3GPP LTE system, for instance, is designed for a sparse deployment of macro base stations (eNodeB) assumed constantly active. The procedure comprises a cell detection step, upon which a mobile station acquires time and frequency synchronization, followed by a phase in which the mobile station acquires other crucial system parameters that are necessary to demodulate other downlink signals. Cell detection comprises a synchronization step based on Primary and Secondary Synchronization Signals (PSS/SSS), followed by a measurement step based on downlink Common Reference Signals (CRS) used to verify the cell ID and perform initial signal strength measurements. These measurements are performed by mobile stations in IDLE mode as part of the cell-search procedure, as well as by mobile stations in RRC_CONNECTED mode when required to monitor, by the serving cell, a set of neighbouring cells for handover purposes.

The requirements for cell detection, listed in Table 1, combine a minimum Signal to Interference+Noise Ratio (SINR) condition with a maximum allowed detection time, e.g., (−6 dB, 800 ms) for intra-frequency with a measurement period of 200 ms. The measurement sampling is implementation specific, but typical values range in 1-2 ms sample/snapshot per 40 ms or per discontinuous reception (DRX) cycle.

TABLE 1

| | E-UTRAN intra-frequency | E-UTRAN inter-frequency |
|---|---|---|
| Received signal quality | CRS: Es/IoT≥−6 dB PSS/SSS: Es/IoT≥−6 dB | CRS: Es/IoT≥−4 dB PSS/SSS: Es/IoT≥−4 dB |
| Measured cells | Up to 7 cells | Up to 3 inter-frequencies and up to 4 cells per frequency |
| Time requirements | Detection time: 800 ms Measurement period: 200 ms | Detection time: (3.84 s, 7.68 s) · $N_{freq}$ Measurement period: 480 ms · $N_{freq}$ |

With the introduction of a DTX operation for network nodes, some or all the signals that are typically transmitted to aid the mobile station to detect a network node, synchronize to, measure the signal strength, and access the network may either be absent or transmitted only sporadically. Detecting the presence of a dormant cell may therefore require longer monitoring time, thereby draining the battery of the mobile station. On the other hand, the prior art procedures are not sufficiently fast to enable a mobile station to quickly detect and perform signal strength measurements from a network node when it operates with discontinuous transmission followed by a very short active time. Therefore, new solutions are needed to aid the mobile stations determine not only the presence of a dormant network node, but also to avoid inefficient usage of battery at the mobile station when the network node operates in DTX mode.

When network nodes in a communication system are enabled to operate with a discontinuous transmission (DTX) mode, i.e., a long dormant state with limited transmission/reception capabilities followed by a short active time, it is a problem to assure fast and energy-efficient detection of the cell at the mobile station. A mobile station failing to detect any network node may need to extend the search procedure for (at least) as long as the shorter reactivation cycle among the dormant cells in its proximity. A further problem is related to timely signal strength measurements such as i.e., Radio Resource Management (RRM) measurements and/or Radio Link Management (RLM) measurements, for network nodes in DTX state. In particular, when a mobile station is configured to monitor the signal strength of network nodes that operate in DTX mode, the mobile station might unnecessarily consume energy if the measurements are taken too early and/or too often prior the network node comes back on active state.

Therefore, it is a problem of the previously known related art to assure timely and energy-efficient cell detection and RRM/RLM measurements at the mobile station when network nodes can operate in a low-duty cycle discontinuous transmission mode.

In the related art 3GPP LTE-Advanced system, a network node in the dormant state of a low-duty cycle discontinuous transmission (DTX) mode shall transmit Discovery Reference Signals (DRS) to aid mobile stations in its proximity to detect its presence and measure signals strength. Discovery signals in the 3GPP LTE-A have been studied in relation to two problems: 1) enhancing the detection performance of active cells in denser small cell deployments; and 2) enabling the discovery of small cells in a dormant state (a.k.a. "off-state"). The requirements and solutions for detecting a small cell in these two cases, however, may be rather different. In the first case, active cells are expected to continue using at least the legacy PSS/SSS/CRS signals and the performance of the cell-search procedure can be improved, for instance, through methods based on PSS/SSS interference cancellation. For the second case, however, the main objective is to enable the mobile station to detect the presence of a cell in a dormant state and perform RRM measurements. Energy-efficiency of the small cell discovery at the mobile station is a crucial aspect in both cases and it should therefore be taken into account in the design of discovery signals.

Discovery signals transmitted by network nodes during a DTX period consist of short bursty transmissions of downlink signals that the mobile station can detect to infer the presence of a dormant network node. The 3GPP TSG-RAN WG1 is currently considering a DRS design for the related art LTE-A based on periodic bursts of existing synchronization signals (i.e., PSS/SSS), existing reference signals such as Channel State Information Reference Signals (CSI-RS), Positioning Reference Signals (PRS), modified version of the LTE synchronization signals and reference signals in LTE, or a combination thereof.

For instance, CSI-RS and PRS have been considered for the design of synchronized transmission of discovery signals in clusters of cells. One method is to let each small cell in a cluster transmit a CSI-RS of a different configuration pattern while muting the CSI-RS resources for all other configuration patterns, thereby enabling fully orthogonal DRS within a cluster. Another method is to let a small cell transmit PRS signals with sub-carrier shifts of reuse factor 6 according to the Physical Cell ID (PCI). Either way, a mobile station may have an advantage of network assistance to acquire the signal's configuration, e.g., carrier, bandwidth, and time-frequency resource used by each cell.

Mobile stations with a connection to an active serving cell, referred to as RRC_CONNECTED mobile stations in LTE, are typically required to monitor reference signals of a set of neighbouring cells to perform RRM/RLM measurements for facilitating the handover procedure. For RRC_CONNECTED mobile stations, the serving network node may provide further assistance to detect the presence of other network nodes in DTX mode. In one example, the serving network node may provide the rough timing of a cluster of synchronized small cells within its coverage area, so that the mobile station can reduce the effort on cell-detection by avoiding synchronizing to the small cell cluster. The serving network node may further inform the mobile station the PCI-like information necessary to identify the neighbouring network nodes in dormant state the mobile station is required to monitor, as well as information related to the configuration of their reference signals.

In contrast, mobile stations in RRC_IDLE mode do not belong to a specific cell and no data transfer my take place prior a connection is formally established with a cell. In this case, network assistance cannot be provided to help the mobile station detect the presence of network nodes in a dormant state. With the legacy LTE cell-search procedures, a mobile station that cannot detect an active cell would persist in the cell-search for (at least) as long as the shorter reactivation cycle among the dormant network node in the mobile station proximity. As this could amount to tens of seconds, the cell-search would severely drain the mobile station battery.

The known prior art, however, cannot assure timely and energy-efficient cell detection and RRM/RLM measurements for either RRC_IDLE and/or RRC_CONNECTED mobile stations. Therefore, from an energy-efficiency view point, it is desirable to introduce new mechanisms for assisting the mobile station.

SUMMARY

It is therefore an object to obviate at least some of the above mentioned disadvantages and to assist a mobile station in monitoring a network node in dormant state, in a wireless communication network.

This and other objects are achieved by the features of the appended independent claims. Further implementation forms are apparent from the dependent claims, the description and the figures.

According to a first aspect, a first network node is provided, configured for providing timing information concerning at least one other network node, operating in discontinuous transmission mode, for enabling a mobile station to monitor the at least one other network node. The first network node comprises a transmitter, configured for transmitting a signal comprising timing information, associated with a state switch between dormant state and active state of the at least one other network node and/or associated to a monitoring operation of the at least one other network node, to be received by the mobile station.

Thereby, timely and energy-efficient cell detection and RRM/RLM measurements at the mobile station are assured, when other network nodes in the wireless communication network may operate in a low-duty cycle discontinuous transmission mode. Further, by enabling a brief monitoring time for the mobile station, the battery operative time of the mobile station may be prolonged.

In a first possible implementation of the first network node according to the first aspect, the first network node also comprises a processor, configured for obtaining timing information, associated with the state switch between dormant state and active state of the at least one other network node.

An advantage with obtaining the timing information of the other network node is that it is possible for the first network node to provide precise information associated with the state switch between dormant state and active state of the at least one other network node, to the mobile station, independently of the relation between the first network node and the other network node, e.g. when both the first network node and the other network node are peers, or comprise small cell nodes in a cluster of small cell nodes.

In a second possible implementation of the first network node according to the first aspect, or the first possible implementation of the first aspect, the timing information may comprise an indication of residual time in dormant state of the at least one other network node.

Thereby, it is possible for the mobile station to autonomously, based on the received indication of the residual time in dormant state of the other network node, decide when to monitor the at least one other network node, without making unnecessary measurements, or requiring prolonged measurement time.

In a third possible implementation of the first network node according to the first aspect, or any of the previous implementations of the first aspect, the timing information may comprise the number of discovery signal bursts left prior to the activation of the at least one other network node.

By providing the number of discovery signal bursts left prior to the switch into active state, the mobile station is enabled to determine when the other network node becomes activated, and thereby determine autonomously when to monitor the other network node, possibly by estimating periodicity of the discovery signal of the other network node.

In a fourth possible implementation of the first network node according to the third possible implementation, the timing information may comprise an indication of periodicity of the discovery signal bursts of the at least one other network node.

An advantage by providing the indication of periodicity of the discovery signal bursts of the at least one other network node to the mobile station, processing efforts and thereby time and battery power is saved in the mobile station.

In a fifth possible implementation of the first network node according to the first aspect, or any of the previous implementations, the timing information may comprise a set of estimates of potential residual times in dormant state of the at least one other network node.

In addition to other benefits, this implementation enables the mobile station to autonomously determine whether and when to monitor, i.e. to detect and/or perform RRM/RLM measurements, the other network node operating in DTX mode.

In a sixth possible implementation of the first network node according to the first aspect, or any of the previous possible implementations, the timing information may comprise a starting time and/or stopping time for the mobile station to start/stop monitoring the at least one other network node, operating in discontinuous transmission mode.

An advantage in addition to other benefits of this implementation comprises reduced signalling overhead in order to indicate to the mobile station when and which other network nodes it should start monitoring.

In a seventh possible implementation of the first network node according to the first aspect, or any of the previous possible implementations, the timing information may comprise a single bit, triggering the mobile station to start and/or stop monitoring the at least one other network node.

An advantage of this embodiment is to further reduce the signalling overhead for controlling the monitoring operation of the mobile station.

In an eighth possible implementation of the first network node according to the first aspect, or any of the previous possible implementations, the timing information may comprise a set of time-lags, each time-lag indicating a delay upon which the mobile station may start monitoring the at least one other network node.

An advantage with some such embodiments is that the first network node may transmit the signal comprising the timing information, not exactly at the moment when the mobile station may start monitoring the at least one other network node, but at any other previous convenient moment in time. Also, the first network node may transmit a plurality of triggering signals for enabling the mobile station to start monitoring different other network nodes, possibly at different moments in time.

In a ninth possible implementation of the first network node according to the first aspect, or any of the previous possible implementations, the timing information may comprise at least one time window for monitoring the at least one other network node.

In combination with other embodiments, this implementation has the advantage of indicating for how long time the mobile station may monitor the other network nodes operating in DTX mode, hence yielding energy saving and thereby prolongation of battery activity time for the mobile station.

In a tenth possible implementation of the first network node according to the first aspect, or any of the previous possible implementations, the at least one other network node may comprise a plurality of other network nodes.

It is thereby enabled for the mobile station to monitor a plurality of other network nodes, based on received timing information from the first network node.

In an eleventh possible implementation of the first network node according to the first aspect, or any of the previous possible implementations, the transmitted signal may be mobile station specific, or mobile stations group specific.

One advantage of this embodiment is to enable the signal itself to be used as an implicit indication of the starting time for monitoring one or more other network nodes operating in discontinuous transmission thereby yielding energy saving.

According to a second aspect, a method is provided, for use in a first network node. The method aims at providing timing information of at least one other network node, operating in discontinuous transmission mode, for enabling a mobile station to monitor the at least one other network node. The method comprises transmitting a signal comprising timing information, associated with a state switch between dormant state and active state of the at least one other network node and/or associated to a monitoring operation of the at least one other network node to be received by the mobile station.

Thereby, timely and energy-efficient cell detection and RRM/RLM measurements at the mobile station are assured, when other network nodes in the wireless communication network may operate in a low-duty cycle discontinuous transmission mode. Further, by enabling a brief monitoring time for the mobile station, the battery operative time of the mobile station may be prolonged.

An advantage of the method is to reduce the processing effort of the mobile station to detect the presence of and/or perform RRM/RLM measurements from the other network node that operates in DTX mode. A further advantage is to enable energy savings at the mobile station by allowing shortening the cell-detection of dormant network nodes and by avoiding unnecessary RRM/RLM measurements.

In a first possible implementation of the method according to the second aspect, the method also comprises obtaining timing information, associated with the state switch between dormant state and active state of the at least one other network node.

An advantage with obtaining the timing information of the other network node is that it is possible for the first network node to provide precise information associated with the state switch between dormant state and active state of the at least one other network node, independently of the relation between the first network node and the other network node, e.g. when both the first network node and the other network node are peers, or comprise small cell nodes in a cluster of small cell nodes.

According to a third aspect, a mobile station is provided, for monitoring at least one other network node, operating in discontinuous transmission mode, based on timing information received from a first network node. The mobile station comprises a receiver, configured for receiving a signal comprising timing information, associated with a state switch between dormant state and active state of the at least one other network node and/or associated to a monitoring operation of the at least one other network node. Also, the mobile station comprises a processor, configured for monitoring said at least one other network node operating in discontinuous transmission mode, according to the received timing information.

Thereby, timely and energy-efficient cell detection and RRM/RLM measurements at the mobile station are assured, when other network nodes in the wireless communication network may operate in a low-duty cycle discontinuous transmission mode. Further, by enabling a brief monitoring time for the mobile station, the battery operative time of the mobile station may be prolonged.

In a first possible implementation of the mobile station according to the third aspect, the processor may be further configured for computing a moment in time when the at least one other network node is going to switch state into active state, based on the received timing information; and also computing a second moment in time when the monitoring is initiated.

An advantage thereby comprises that it thereby is enabled for the mobile station to compute a moment in time when the monitoring of the other network node is to be initiated, independently of the relation between the first network node and the other network node, e.g. when both the first network node and the other network node are peers, or comprise small cell nodes in a cluster of small cell nodes.

In a second possible implementation of the mobile station according to the third aspect, or the first possible implementation of the third aspect, the processor may be further configured for measuring a signal received from the at least one other network node, based on the timing information received from the first network node. Also, the mobile station may further comprise a transmitter, configured for transmitting measurement data of the signal received from the at least one other network node, to be received by the first network node.

An advantage by measuring signal strength/quality of the other network node at the mobile station and provide such measurements to the first network node is that the first network node may utilise the measurements e.g. for determining to hand over the mobile station to the other network node, based on the made measurements, leading to an improved functionality of the wireless communication network.

According to a fourth aspect, a method is provided in a mobile station, configured for, based on timing information received from a first network node, monitoring at least one other network node, operating in discontinuous transmission mode. The method comprises receiving a signal comprising timing information, associated with a state switch between dormant state and active state of the at least one other network node and/or associated to a monitoring operation of the at least one other network node. Further, the method comprises monitoring said at least one other network node operating in discontinuous transmission mode, based on the received timing information.

Thereby, timely and energy-efficient cell detection and RRM/RLM measurements at the mobile station are assured, when other network nodes in the wireless communication network may operate in a low-duty cycle discontinuous transmission mode. Further, by enabling a brief monitoring time for the mobile station, the battery operative time of the mobile station may be prolonged.

An advantage of the method is to reduce the processing effort of the mobile station to detect the presence of and/or perform RRM/RLM measurements from the other network node that operates in DTX mode. A further advantage is to enable energy savings at the mobile station by allowing shortening the cell-detection of dormant network nodes and by avoiding unnecessary RRM/RLM measurements.

In a first possible implementation of the method according to the fourth aspect, the method further comprises computing a first moment in time when the at least one other network node is going to switch state into active state, based on the received timing information; and also computing a second moment in time when the monitoring is initiated.

An advantage thereby is that the mobile station autonomously, based on the received timing information, may decide when to monitor the at least one other network node, without making unnecessary measurements, or requiring prolonged measurement time.

In a second possible implementation of the method according to the fourth aspect, or the first possible implementation of the fourth aspect, the monitoring of the at least one other network node may comprise detecting and/or measuring a signal received from the at least one other network node. Also, the method further comprises transmitting measurement data of the signal received from the at least one other network node, to be received by the first network node.

An advantage by measuring signal strength/quality of the other network node at the mobile station and provide such measurements to the first network node is that the first network node may utilise the measurements e.g. for determining to hand over the mobile station to the other network node, based on the made measurements, leading to an improved functionality of the wireless communication network.

By enabling the mobile station to monitor another network node, operating in discontinuously transmission mode, i.e., a long dormant state with limited transmission/reception capabilities followed by a short active time, it may be assured that the mobile station is enabled to fast and securely detect the other network node, energy may be saved at the mobile station. Thereby only a brief detection period may be required for the mobile station to detect the other network node, and possibly perform signal measurements of signals transmitted by the other network node.

Thereby, energy is saved at the mobile station, which may prolong the battery activity time between re-charge. Also, the reduced signalling within the communication system generates less uplink interference within the system. Thereby an improved performance within the wireless communication network is provided.

Other objects, advantages and novel features of the described aspects will become apparent from the following detailed description.

BRIEF DESCRIPTION OF THE DRAWINGS

Various embodiments are described in more detail with reference to attached drawings, illustrating examples of embodiments of the invention in which.

DETAILED DESCRIPTION

Embodiments of the invention described herein are defined as a first network node, a method in a first network node, a mobile station and a method in a mobile station, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
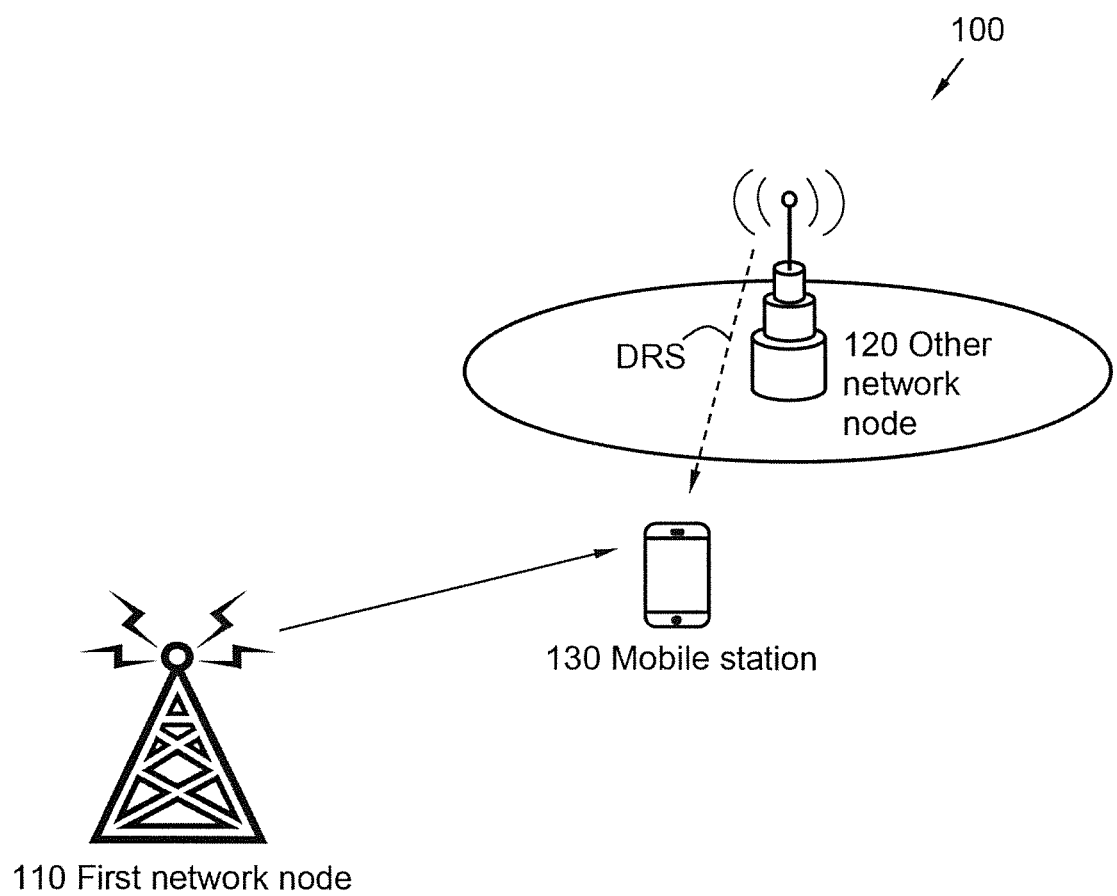
FIG. 1 is a block diagram illustrating a wireless communication network according to some embodiments.

FIG. 1 is a schematic illustration over a wireless communication network 100 comprising a first network node 110, another network node 120 operating in DTX mode and a mobile station 130.

The wireless communication network 100 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, World-wide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1×RTT and High Rate Packet Data (HRPD), just to mention some few options. The expressions "wireless communication network", "wireless communication system" and/or "cellular telecommunication system" may within the technological context of this disclosure sometimes be utilised interchangeably.

The wireless communication network 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a Guard Period (GP) situated in the time domain between the uplink and downlink signalling. FDD means that the transmitter and receiver operate at different carrier frequencies.

The purpose of the illustration in FIG. 1 is to provide a simplified, general overview of the wireless communication network 100 and the involved methods and nodes, such as the first network node 110, the other network node 120 and the mobile station 130 herein described, and the functionalities involved. The methods, network nodes 110, 120, and mobile station 130 will subsequently, as a non-limiting example, be described in a 3GPP LTE/LTE-Advanced environment. However the disclosed embodiments may operate in a wireless communication network 100 based on another access technology such as, e.g., any of the above already enumerated. Thus, although the embodiments of the invention are described based on, and using the lingo of, 3GPP LTE systems, it is by no means limited to 3GPP LTE. Further, the terms radio network node, network node, base station, and cell are used interchangeably in the sequel.

The illustrated first network node 110 comprised in the wireless communication network 100 may send and receive radio signals in order to communicate wirelessly with the mobile station 130. The other network node 120 is operating in discontinuous transmission mode and may thus sporadically and/or periodically transmit discovery reference signals (DRS).

In order to assist the mobile station 130 to monitor the other network node 120, the first network node 110 may send e.g. an indication of the reactivation time of the other network node 120, as the other network node 120 is enabled with a discontinuous transmission mode.

According to some embodiments, a signal is transmitted, from the first network node 110 to the mobile station 130, comprising an indication of the residual time in dormant state of at least the other network node 120 operating in discontinuous transmission mode and/or an indication of a starting time for monitoring, i.e., detecting and/or performing RRM/RLM measurements at least the other network node 120 operating in discontinuous transmission mode. The signal comprising the information is received by the mobile station 130. Then, based on the received information, the mobile station 130 may start monitoring the other network node 120 operating in discontinuous transmission mode according to the received signal.

It is to be noted that the illustrated network setting of one instance of the first network node 110, one instance of the other network node 120 and one mobile station 130 in FIG. 1 is to be regarded as a non-limiting example of an embodiment only. The wireless communication network 100 may comprise any other number and/or combination of the discussed network nodes 110, 120 and/or mobile stations 130. A plurality of mobile stations 130 and another configuration of network nodes 110, 120 may thus be involved in some embodiments of the disclosed invention. When reference is made herein to "the other network node 120", the at least one other network node 120 may comprise a plurality of other network nodes, according to some embodiments.

Thus whenever "one" or "a/an" first network node 110, other network node 120 and/or mobile station 130 is referred to in the present context, a plurality of the first network node 110, and/or other network nodes 120 and/or mobile stations 130 may be involved, according to some embodiments.

Further, the first network node 110 and the other network node 120, according to some embodiments, may be configured for downlink transmission and uplink reception, and may be referred to, respectively, as e.g., a base station, a NodeB, an evolved Node Bs (eNB, or eNode B), a base transceiver station, an Access Point Base Station, a base station router, a Radio Base Station (RBS), a micro base station, a pico base station, a femto base station, a Home eNodeB, a sensor, a beacon device, a relay node, a repeater or any other network node configured for communication with the mobile station 130 over a wireless interface, depending, e.g., of the radio access technology and/or terminology used.

The mobile station 130 may correspondingly be represented by, e.g. a wireless communication terminal, a mobile cellular phone, a Personal Digital Assistant (PDA), a wireless platform, a user equipment, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the first network node 110 and/or the other network node 120, according to different embodiments and different vocabulary.

Some embodiments of the invention may define a modular implementation approach, and make it possible to reuse legacy systems such as e.g. standards, algorithms, implementations, components and products.

Figure 2:
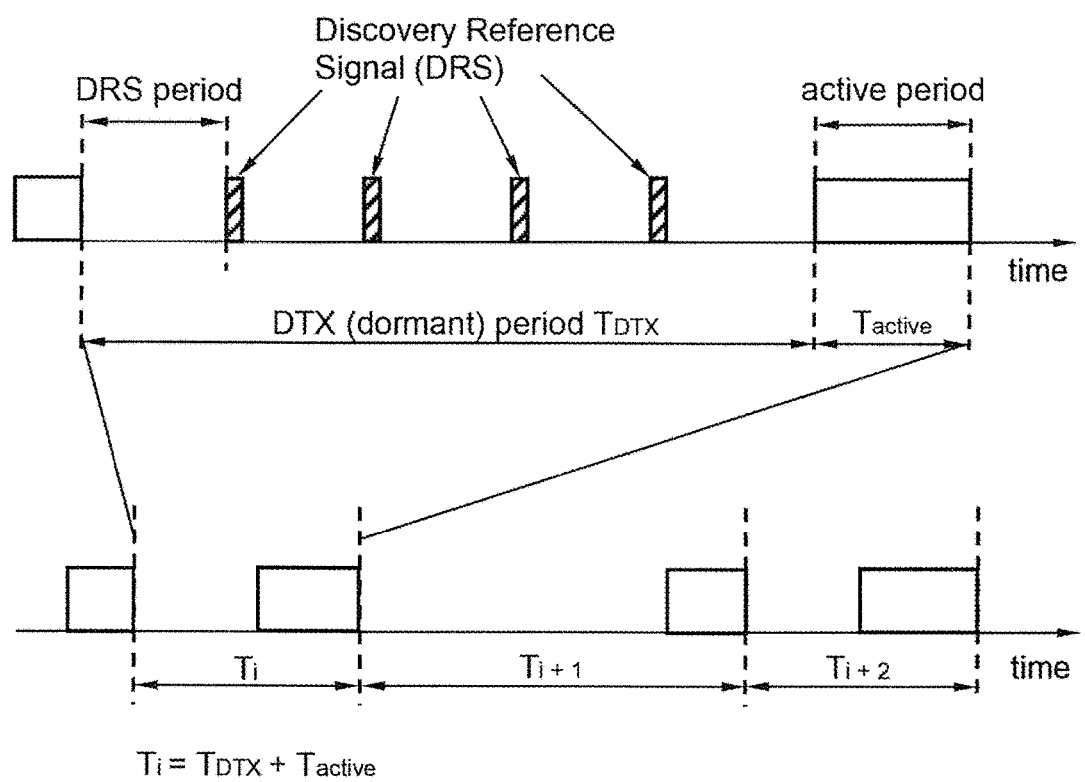
FIG. 2 is a block diagram illustrating another network node operating in DTX mode, transmitting DRS in periodic bursts.

The other network node 120 is enabled to operate in a discontinuous transmission mode (DTX) comprising a dormant period (a.k.a. "off-state") with limited transmission/reception capabilities, followed by an active period as illustrated in FIG. 2. During the dormant period, the other network node 120 is enabled to transmit downlink reference signals, a.k.a. Discovery Reference Signals (DRS) intended to aid mobile stations 130 to detect the presence of the dormant node 120 and perform RRM measurements. Without loss of generality, it is here assumed that DRS are transmitted in short bursts of N ms, with a period of M ms, where N and M are arbitrary numbers and N M. The DRS signals transmitted by different network nodes 120 can further be time-multiplexed by an offset of Q ms. With respect to the terminology used in the related art LTE system, the quantities N, M, and Q can equivalently be expressed in terms of time slots (e.g., of duration 0.5 ms), subframes (e.g., of duration 1 ms), radio frames (e.g., of duration 10 ms), or any arbitrary combination thereof.

In some embodiments, the first network node 110 may be the serving network node for the mobile station 130, while the other network node 120 may be a neighbouring node to which the mobile station 130 could be offloaded or handed over. With respect to the related art LTE system, the first network node 110 may be a primary cell (PCell) providing network assistance to the mobile station 130 (e.g., a macro-eNodeB), while the other network node 120 may be a secondary cell (SCell) such as a pico-eNodeB or a small cell node. The first network node 110 could further be a small cell node coordinating the operation of a cluster of small cell nodes, in some embodiments.

Therefore, one objective of the disclosed method is to enable the mobile station 130 to efficiently monitor other network nodes 120 operating in discontinuous transmission mode, either autonomously (i.e. by providing an indication of the residual time in dormant state of the other network nodes 120 and enable the mobile station 130 to decide by itself when to monitor) or in a controlled way, (i.e., by providing an indication of when to start monitoring the other network nodes 120 operating in DTX mode). Monitoring a network node 120 operating in DTX mode is intended here as one or more actions in the group of: detecting the presence of said one other network node; performing measurements (e.g., RRM/RLM measurements) based on downlink signals transmitted by the other network node 120 in DTX mode; and reporting said measurements of discovery signals from the mobile station 130 to said first network node 110. Measurements of signals transmitted by the other network node 120 in DTX mode may comprise one or more in the group of: Reference Signal Received Power (RSRP), Reference Signal Received Quality (RSRQ), Channel State Information (CSI), Channel Quality Indicators (CQI), Signal to Noise and Interference Ratio (SINR), Signal to Noise Ratio (SNR), Signal to Interference Ratio (SIR), Signal to Noise plus Interference Ratio (SNIR), or any other appropriate measurement reflecting the strength and/or quality of a signal, and/or a ratio between a certain desired signal and undesired interference or noise. Thereby, the first network node 110 may trigger the monitoring operation of a mobile station 130 associated to at least other network node 120, operating in discontinuous transmission mode.

An advantage of the method is to reduce the processing effort of the mobile station 130 to detect the presence of and/or perform RRM/RLM measurements from any other network node 120 that operates in DTX mode. Thereby more processing capacity of the mobile station 130 may be free to utilize for other tasks. A further advantage is to enable energy savings at the mobile station 130 by allowing shortening the cell-detection of dormant network nodes 120 and by avoiding unnecessary RRM/RLM measurements. This is important as battery operating time is critical for the mobile station 130, as for most portable electronic equipment, due to user demands of high portability/slim design, which put a limit on battery size and thereby also battery capacity of the mobile station 130. Reducing energy consumption at the mobile station side according to the disclosed method thus extends the operating time of the mobile station 130, without losing any functionality.

An additional advantage is to configure an appropriate timing for the mobile station 130 to perform and/or report RRM/RLM measurements of discovery signals transmitted by at least other network node 120 operating in DTX mode, e.g. shortly before any other network node 120 operating in DTX mode transits to active state, or to anticipate RRM/RLM measurements so as to trigger the reactivation of the other network node 120 based on the reported signal measurements.

The mobile station 130 can be configured by the first network node 110 to monitor a set of candidate network nodes 120 operating in discontinuous transmission mode. Said configuration may comprise, for instance, a list of K other network nodes 120 and the respective parameter configuration of discovery signals, such as the time-frequency resources used, the burst length (N), the periodicity (M), a time offset (Q), the type of signal used for discovery, etc., where K is an arbitrary integer.

In one embodiment, the indication of residual time in dormant state of the at least one other network node 120 operating in discontinuous transmission mode may comprise the number of discovery signal bursts left prior to the activation of the other network node 120. The periodicity of the discovery signal can be estimated by the mobile station 130 (e.g., by detecting multiple DRS) or being signalled in addition to the number of discovery signal bursts left in different embodiments. Combined with the periodicity N of the discovery signal associated to the other network node 120 operating in DTX mode, this additional information may enable the mobile station 130 to determine a rough estimate of the time left prior to the other network node 120 becomes active. The indication of residual time in dormant state of the at least one other network node 120 operating in DTX mode may be expressed in terms of time (e.g. in milliseconds), time slots, number of subframes, number of radio frames, or any combination thereof.

In one embodiment, the first network node 110 may transmit an estimates D of the residual time in dormant state associated to at least another network node 120 operating in DTX mode, to be received by the mobile station 130. In alternative, the first network node 110 further may transmit a set of L estimates $\{D_1, \ldots, D_L\}$ of potential residual time in dormant state for other network nodes 120 operating in DTX mode, to be received by the mobile station 130.

In some embodiments, e.g. in case the first network node 110 transmits L estimates, said indication of the residual time in dormant state of the at least one other network node 120 operating in DTX mode transmitted by the first network node 110 may comprise at least one out said L possible values. In other words, the mobile station 130 may first be configured with a set of values $\{D_1, \ldots, D_L\}$ indicating potential residual times in dormant state that can be signalled, hence the signal transmitted by said first network node 110 may indicate one of the values in the set $\{D_1, \ldots, D_L\}$. While the set of values $\{D_1, \ldots, D_L\}$ may be semi-statically configured by said first network node 110, for instance, by higher layer Radio Resource Control (RRC) signalling, the signal transmitted by said first network node 110 to indicate one of the values in the set $\{D_1, \ldots, D_L\}$ can be dynamic, e.g., by a physical downlink control channel, such as PDCCH/e-PDCCH in an LTE context, as illustrated in FIG. 3.

Figure 3:
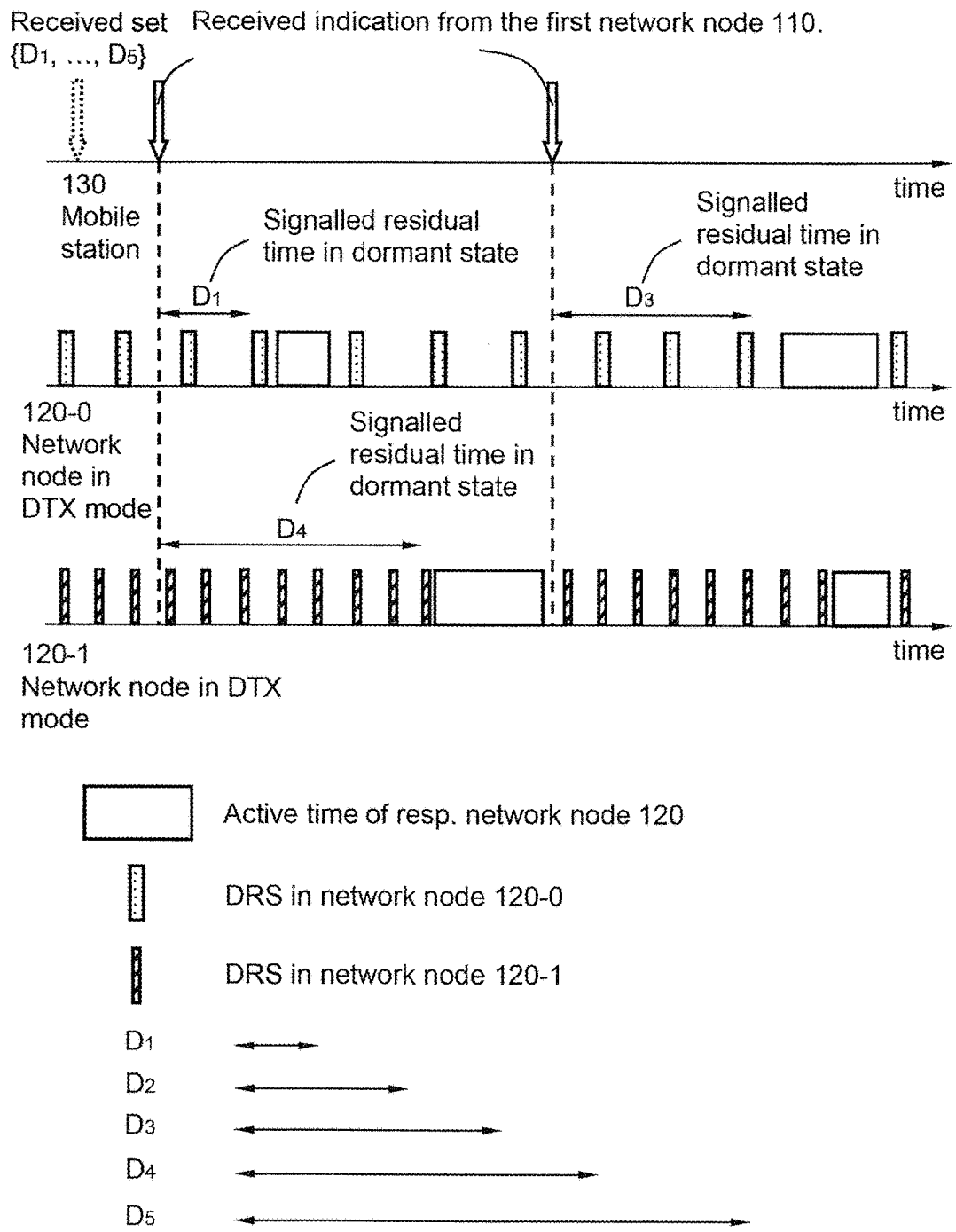
FIG. 3 is a block diagram illustrating a transmission from a first network node to a mobile station, according to some embodiments of the invention.

FIG. 3 illustrates the transmission, from the first network node 110 to the mobile station 130, of an indication of the residual time in dormant state of other network nodes 120 operating in DTX mode.

Thus, $B_L=\lceil \log 2(L) \rceil$ bits or an L-bit bitmap may be used to indicate the residual time in dormant state associated with the at least one other network node 120 operating in DTX mode. Alternatively, said value may not be explicitly associated with any particular other network node 120. In addition to other benefits, this method enables the mobile station 130 to autonomously determine whether and when to start monitoring (i.e. to detect and/or perform RRM measurements) any other network node 120 operating in DTX mode.

In one embodiment of the invention, the signal transmitted by the first network node 110 may indicate at least one other network node 120 operating in DTX mode that the mobile station 130 may start monitoring. If the mobile station 130 is pre-configured by the first network node 110 with a set of K candidate network nodes 120 enabled to operate in DTX mode, the signal transmitted by the first network node 110 to the mobile station 130 may be associated with one or multiple of said K candidate network nodes 120. In one example, the signal transmitted by the first network node 110 to the mobile station 130 may comprise, for instance a K-bit bitmap with the generic k-th bit equal 1 when the mobile station 130 may start monitoring the k-th other network node 120 in the list. In yet an embodiment, one other network node 120 in the list may be individually indicated to the mobile station 130 by $B_K=\lceil \log 2(K)\rceil$ bits or by a network node identity. Upon receiving the signal, the mobile station 130 may start monitoring the network nodes 120 indicated by information comprised in the signal, thus, the starting time implicitly coincides with reception of the signal as illustrated in FIG. 4.

Figure 4:
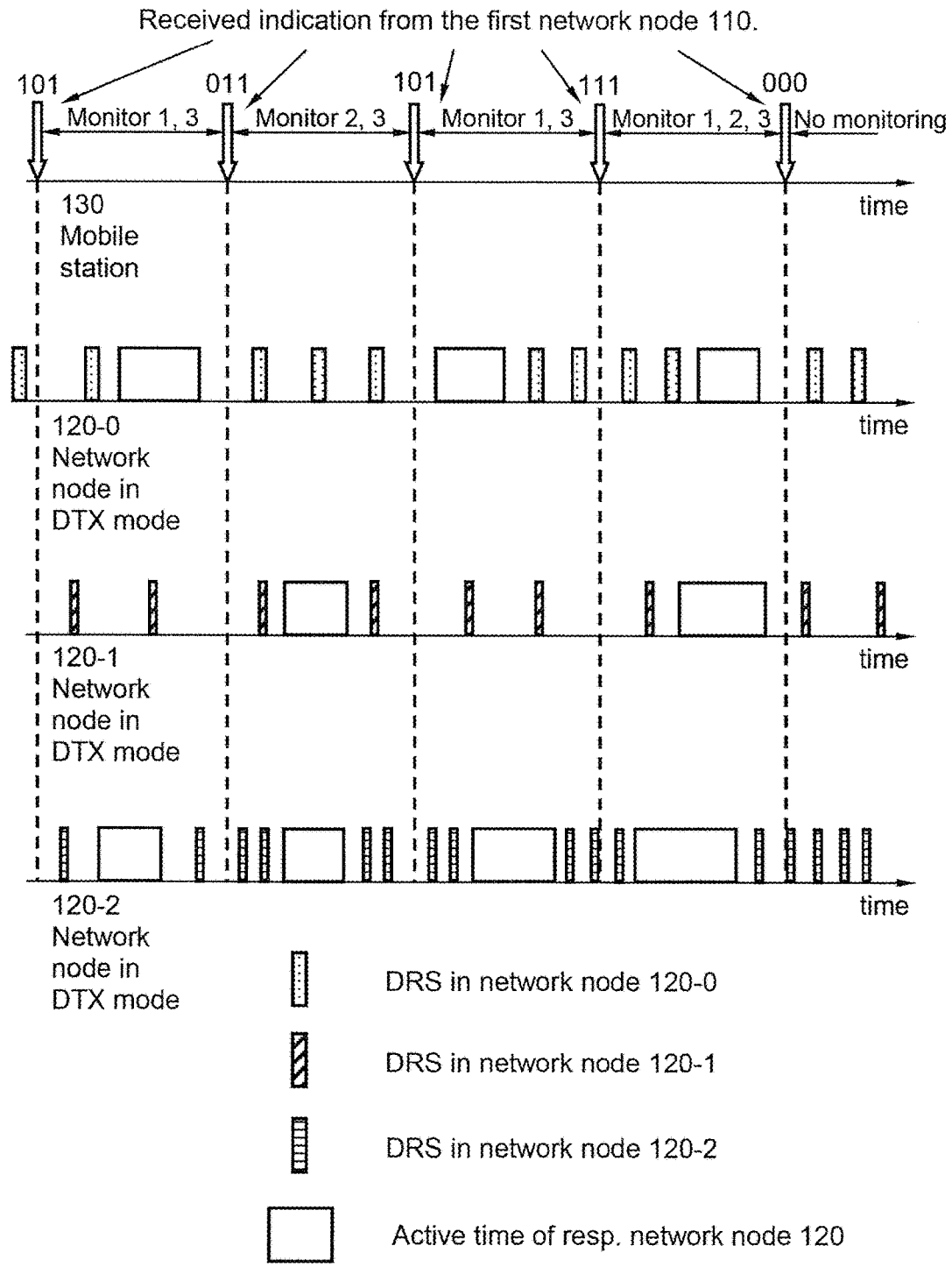
FIG. 4 is a block diagram illustrating a mobile station configured to monitor three other network nodes operating in DTX mode.

FIG. 4 illustrates an embodiment wherein the mobile station 130 is configured to monitor (e.g., detect and make RRM measurements) three other network nodes 120 operating in discontinuous transmission mode. A signal is transmitted from the first network node 110 to the mobile station 130 to indicate which other network node 120 to start detecting and/or perform and report measurements of discovery signals.

In addition to other benefits, an advantage of this method is the reduced signalling overhead necessary to indicate to a mobile station 130 when and which other network nodes 120 it may start detecting the presence of, and/or perform RRM/RLM measurements.

In one embodiment of the invention, the signal transmitted by the first network node 110 to the mobile station 130 to indicate when to start monitoring (e.g., detect the presence of and/or perform RRM/RLM measurements from) the at least one other network node 120 operating in discontinuous transmission mode may comprise a single bit. In this case, one value of the bit (e.g., bit=1; or alternatively bit=0) may be used to indicate that the mobile station 130 shall start monitoring other network nodes 120 operating in DTX mode, while the remaining value (e.g., bit=0; or alternatively bit=1) may be used as an indication to stop monitoring other network nodes 120 operating in DTX mode. In this case, the indication may or may not be associated to a specific other network node 120 operating in DTX mode. The signal itself is a trigger to start the monitoring operation. The advantage of this method is that signalling overhead is further reduced, which saves bandwidth and transmission energy, reduces signalling interference within the system 100 and also further reduces requirements of processing power at the mobile station 130.

In one embodiment, the first network node 110 may transmit a time-lag T indicating a delay upon which the mobile station 130 may start detecting the presence of and/or perform RRM/RLM measurements for at least one other network node 120 operating in DTX mode. In alternative, the first network node 110 further transmits to the mobile station 130 a set of H time-lags $\{T_1, \ldots, T_H\}$, each time-lag indicating a delay upon which the mobile station 130 may start detecting the presence of and/or perform RRM/RLM measurements for at least one other network node 120 operating in dormant state. In this case, the indication of the time when the mobile station 130 may start monitoring the other network node 120 operating in DTX mode may comprise at least one out said H possible values $\{T_1, \ldots, T_H\}$. In other words, the mobile station 130 may be first configured with a set of possible values $\{T_1, \ldots, T_H\}$ indicating a delay upon which the mobile station 130 may start monitoring network nodes 120 operating in DTX mode, hence the signal transmitted by the first network node 110 indicates, for at least one other second network node 120, one of the values in the set $\{T_1, \ldots, T_H\}$. While the set of values $\{T_1, \ldots, T_H\}$ may be semi-statically configured by said first network node 110, for instance, by higher layer Radio Resource Control (RRC) signalling, the signal transmitted by said first network node 110 to indicate one of the values in the set $\{T_1, \ldots, T_H\}$ can be dynamic, e.g., by a physical downlink control channel such as e.g. PDCCH/e-PDCCH in an LTE context, as in FIG. 5.

Figure 5:
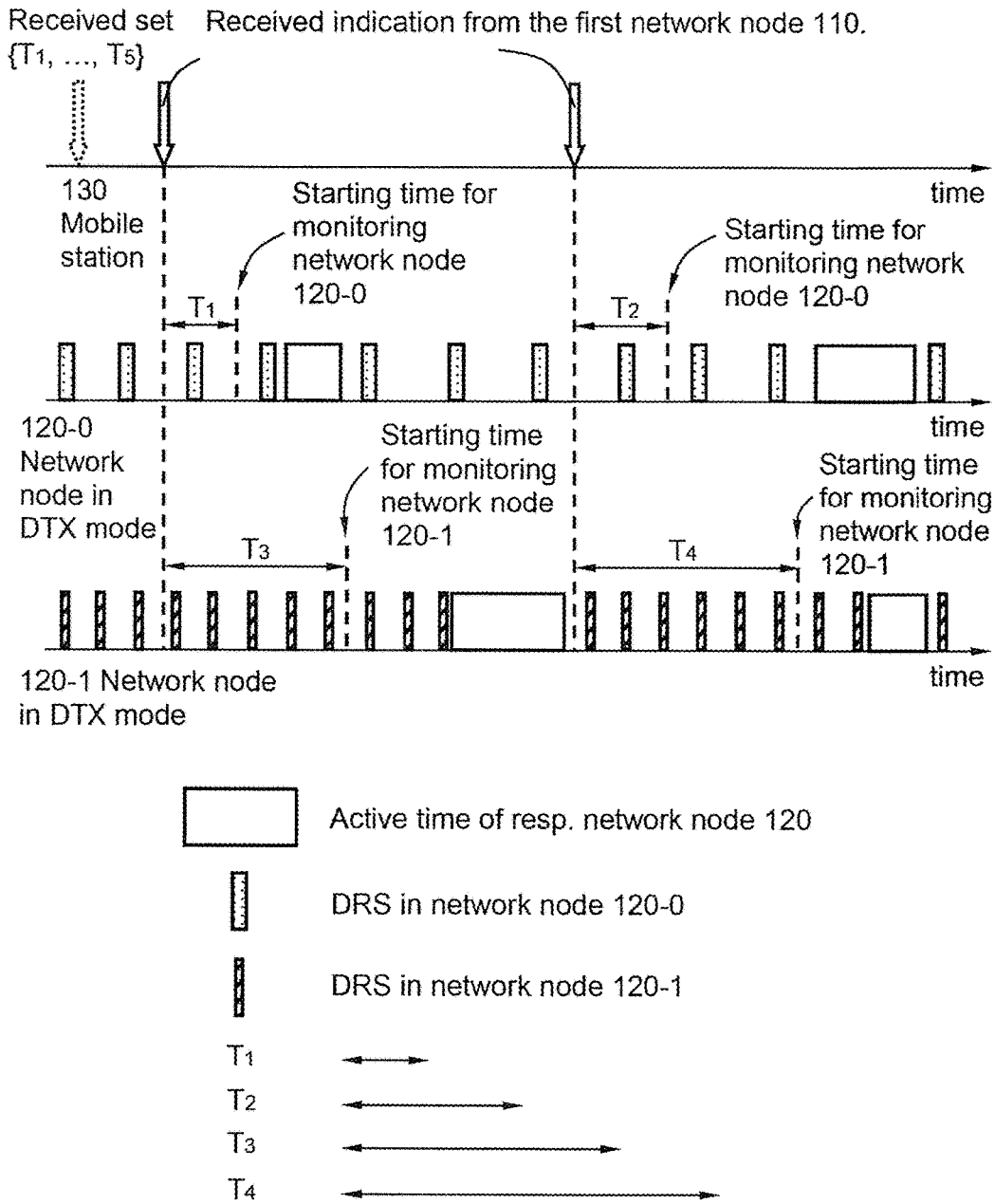
FIG. 5 is a block diagram illustrating a mobile station configured to monitor two other network nodes operating in DTX mode.

FIG. 5 illustrates an embodiment wherein the mobile station 130 is configured to monitor two other network nodes 120-0, 120-1 operating in discontinuous transmission mode. A signal is transmitted from the first network node 110 to the mobile station 130, indicating when and which other network node 120-0, 120-1 to start detecting and perform measurements.

The indicated time may be associated to at least one other network node 120 operating in DTX mode, or being not associated to any other network node 120 operating in DTX mode in different embodiments. Thus, $B_H=\lceil \log 2(H)\rceil$ bits or a H-bit bitmap may be used to indicate the one of the H time delays upon which the mobile station 130 may start monitoring other network nodes 120 operating in DTX mode. In one example, multiple time-lags or delays may be simultaneously transmitted, each associated with at least one other network node 120 operating in DTX mode as illustrated in FIG. 5.

In one embodiment, the information signalled from the first network node 110 to the mobile station 130 further may comprise at least one time window W indicating the duration of for how long the mobile station 130 may monitor at least one other network node 120 operating with discontinuous transmission mode. Said time window may be associated with one or multiple other network nodes 120 operating with DTX mode to be monitored or not being associated with any particular other network node 120 to be monitored in some embodiments. The time window may be expressed, for instance, in time (e.g. in milliseconds), in time slots, in number of subframes, in number of radio frames or in a combination thereof. The time window could be associated to one or more in the group of: for how long the mobile station 130 may detect the presence of at least one other network node 120 operating with discontinuous transmission mode (i.e., a detection window); for how long the mobile station 130 may measure downlink signals transmitted by at least one other network node 120 operating with discontinuous transmission mode (i.e., a measuring window); for how long the mobile station 130 may report measurements of downlink signals transmitted by at least one other network node 120 operating with discontinuous transmission mode (i.e., a reporting window); or a combination thereof.

In one embodiment, the first network node 110 may transmit a set $\{W_1, \ldots, W_S\}$ of time windows to the mobile station 130. Hence, a particular time window W in the set $\{W_1, \ldots, W_S\}$ may be indicated by said first network node 110 to the mobile station 130 with at least $B_W=\lceil \log 2(S)\rceil$ bits. While the set of values $\{W_1, \ldots, W_S\}$ may be semi-statically configured by said first network node 110, for instance, by higher layer Radio Resource Control (RRC) signalling, the signal transmitted by said first network node 110 to indicate one of the values in the set $\{W_1, \ldots, W_S\}$ can be dynamic, e.g., by a physical downlink control channel such as PDCCH/e-PDCCH in an LTE context. In combination with other embodiments, this method embodiment has the advantage of indicating for how long the mobile station 130 may monitor the other network nodes 120 operating in DTX mode, hence yielding energy saving for the mobile station 130.

In an embodiment of the method, the signal transmitted from the first network node 110 to a mobile station 130 further may indicate time-frequency resources in which said mobile station 130 shall monitor the at least one other network node 120 operating in DTX mode. The signal may indicate, for instance, in which subframes(s) and/or radio frame(s) and/or resource blocks the mobile station 130 may measure and/or report measurements of DRS signals transmitted by the other network node 120 operating in DTX mode. The benefit of this embodiment is to indicate to the mobile station 130 not only when to monitor at least one other network node 120 operating in DTX mode, but also in which resources. Thereby processing efforts are saved at the mobile station 130, leading to extended battery activation time.

In an embodiment of the invention, the signal transmitted from the first network node 110 to the mobile station 130 further may indicate which type of measurements of DRS signals transmitted by the other network node 120 operating in DTX mode, the mobile station 130 may take and/or report to the first network node 110. Examples of type of signal measurements may comprise e.g., Reference Signal Received Power (RSRP), Reference Signal Received Quality (RSRQ), Channel State Information (CSI), Channel Quality Indicators (CQI), Signal to Noise and Interference Ratio (SINR), Signal to Noise Ratio (SNR), Signal to Interference Ratio (SIR), Signal to Noise plus Interference Ratio (SNIR), or any other appropriate measurement reflecting the strength and/or quality of a signal, and/or a ratio between a certain desired signal and undesired interference or noise. The benefit of this embodiment comprises that indication is enabled, not only when to monitor the at least one other network node 120 operating in DTX mode, for the mobile station 130 but also what type of measurements to report to the first network node 110, thereby improving the efficiency of the mobile station 130.

In one embodiment of the invention, the signal may be transmitted from the first network node 110 as part of a physical downlink control channel, such as e.g., PDCCH or ePDCCH, in a mobile station-specific or mobile station group-specific manner. One advantage of this method embodiment is to enable the signal itself to be used as an implicit indication of the starting time for monitoring the one or more other network nodes 120 operating in discontinuous transmission. In combination with other embodiment, multiple fields of the transmitted control information (such as a DCI in an LTE context) may be used to signal information specific to one or multiple other network nodes 120 operating in DTX mode, to be monitored by the mobile station 130. Upon receiving a new indication from the first network node 110, the mobile station 130 may start monitoring the other network nodes 120 indicated in the received signal. As physical downlink control channels in LTE are transmitted dynamically in each subframe (1 ms time), this method embodiment enables to dynamically configure the mobile station 130 to monitor different other network nodes 120 in DTX mode at different times by transmitting different signals at different time as illustrated in FIGS. 3-5. In the illustrated embodiment in FIG. 4, a 3-bit field is signalled from the first network node 110 to the mobile station 130 indicating which other network nodes 120 it should start monitoring.

In one embodiment of the invention, at least part of the information is transmitted using a physical downlink shared channel such as e.g., PDSCH in LTE, or higher layer Radio Resource Control (RRC) signalling. The advantage of such method embodiments comprises reduction of signalling overhead. This information could therefore be signalled from the first network node 110 to the mobile station 130 along with the discovery signal configuration parameter associated to the other network nodes 120 supposed to be monitored.

Figure 6:
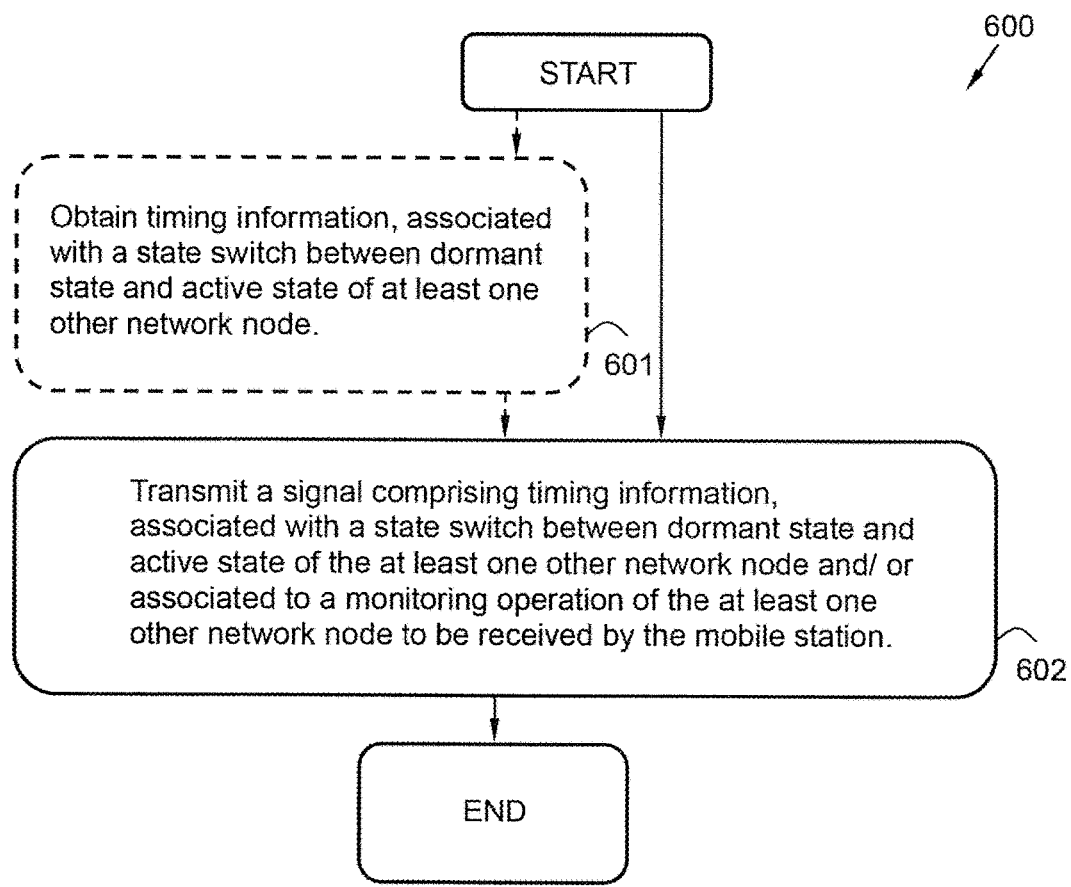
FIG. 6 is a flow chart illustrating a method in a first network node according to an embodiment.

FIG. 6 is a flow chart illustrating embodiments of a method 600 for use in a first network node 110, for providing timing information of at least one other network node 120, operating in discontinuous transmission mode, for enabling a mobile station 130 to monitor the at least one other network node 120 in a wireless communication network 100. The at least one other network node 120 may comprise a plurality of other network nodes 120-0, 120-1, 120-2 in some embodiments.

The mobile station 130 may be served by the first network node 110 in a heterogeneous wireless communication system 100 comprising the first network node 110 and at least one other network node 120.

The wireless communication network 100 may be based on 3GPP LTE. Further, the wireless communication system 100 may be based on FDD or TDD in different embodiments. The first network node 110 and/or the other network node 120 may comprise an evolved NodeB (eNodeB) according to some embodiments.

To appropriately provide the timing information of at least one other network node 120, operating in discontinuous transmission mode, to the mobile station 130, the method 600 may comprise a number of actions 601-602. It is however to be noted that any, some or all of the described actions 601-602, may be performed in a somewhat different chronological order than the enumeration indicates, be performed simultaneously or even be performed in a completely reversed order according to different embodiments. Also, some actions such as e.g. actions 601 may be performed only within some alternative embodiments. Further, it is to be noted that some actions may be performed in a plurality of alternative manners according to different embodiments, and that some such alternative manners may be performed only within some, but not necessarily all embodiments. The method 600 may comprise the following actions:

Action 601

This action may be performed within some, but not necessarily all embodiments of the method 600.

Timing information, associated with the state switch between dormant state and active state of the at least one other network node 120 may be obtained. In some embodiments, such information may be obtained e.g. over an intra-radio network node connection from the other network node 120, such as S1 and/or X2.

The timing information may comprise an indication of residual time in dormant state of the at least one other network node 120 in some embodiments. Further, in some embodiments, the timing information may comprise the number of discovery signal bursts left prior to the activation of the at least one other network node 120. According to some embodiments, the timing information may further comprise an indication of periodicity of the discovery signal bursts of the at least one other network node 120.

Further, in some embodiments, the timing information may comprise a set of estimates of potential residual times in dormant state of the at least one other network node 120.

Action 602

A signal is transmitted, comprising timing information, associated with a state switch between dormant state and active state of the at least one other network node 120 and/or associated to a monitoring operation of the at least one other network node 120 to be received by the mobile station 130.

In some embodiments, the timing information may comprise an indication of residual time in dormant state of the at least one other network node 120; the number of discovery signal bursts left prior to the activation of the at least one other network node 120; an indication of periodicity of the discovery signal bursts of the at least one other network node 120 and/or one or a set of estimates of potential residual times in dormant state of the at least one other network node 120.

Thus, in some embodiments, the mobile station 130 may compute when the other network node 120 is going to switch into active mode, based in the received information, by knowing the number of discovery signal bursts left prior to the activation and/or the periodicity of the discovery signal bursts of the at least one other network node 120. However, in other embodiments, the mobile station 130 may compute the periodicity of the discovery signal bursts of the at least one other network node 120 by own calculations.

However, in some embodiments, the timing information may comprise a starting time and/or stopping time for the mobile station 130 to start/stop monitoring the at least one other network node 120, operating in discontinuous transmission mode. Thus, according to some such embodiments, the signal comprising the timing information may function as a trigger for the mobile station 130 to start/stop the monitoring. An advantage with such embodiments is that less computation has to be made by the mobile station 130, thereby saving processing resources and battery capacity of the mobile station 130. The timing information may comprise a single bit, triggering the mobile station 130 to start and/or stop monitoring the at least one other network node 120. Thus the mobile station 130 may start monitoring the at least one other network node 120 when receiving a bit set to 1, or alternatively when the received bit is set to 0. Further, in some embodiments, the mobile station 130 may stop monitoring the at least one other network node 120 when receiving a bit set to 0, or alternatively when the received bit is set to 1. An advantage with these embodiments, triggering the mobile station 130 to start/stop monitoring by transmitting one single bit is that little additional radio traffic is required. Thus signalling overhead may be required.

Furthermore, the timing information may further comprise one or a set of time-lags, each time-lag indicating a delay upon which the mobile station 130 may start monitoring the at least one other network node 120. An advantage with some such embodiments is that the first network node 110 may transmit the signal comprising the timing information, not exactly at the moment when the mobile station 130 may start monitoring the at least one other network node 120, but at any other previous convenient moment in time. Also, the first network node 110 may transmit a plurality of triggering signals for enabling the mobile station 130 to start monitoring different other network nodes 120, possibly at different moments in time.

Furthermore, the timing information may comprise at least one time window for monitoring the at least one other network node 120.

The transmitted signal maybe mobile station specific; or mobile stations group specific in some embodiments.

Furthermore, the signal may be transmitted as part of a physical downlink control channel, such as PDCCH and/or EPDCCH in some embodiments. Also, in some embodiments, the signal may be transmitted by using physical downlink shared channel, such as PDSCH; or higher layer RRC signalling.

In some embodiments, the first network node 110 may further receive signal measurements from the mobile station 130, which measurements have been made by the mobile station 130 of a signal received by the mobile station 130 from the other network node 120. Based on that received signal measurements, the first network node 110 may e.g. determine to hand over the mobile station 130 to the other network node 120 according to a hand over algorithm.

Figure 7:
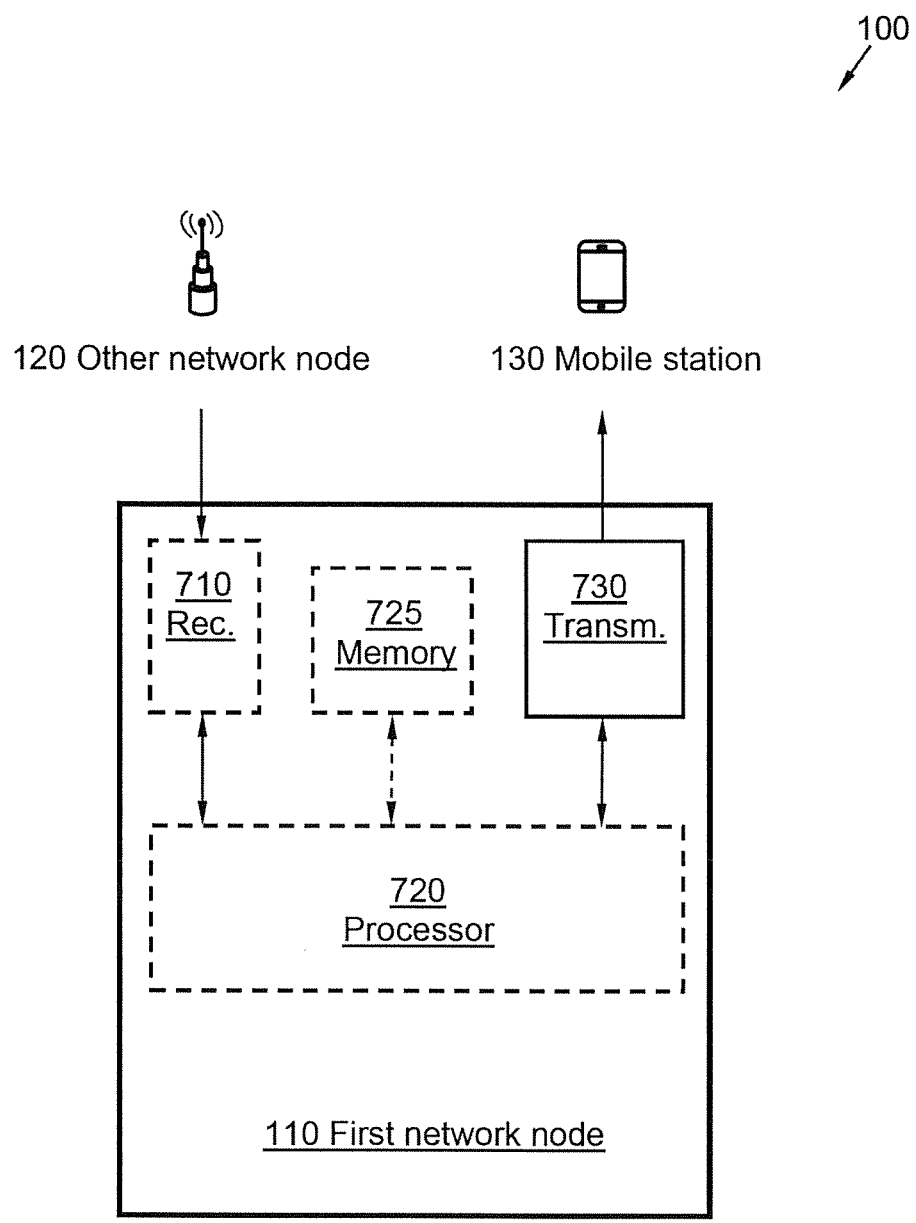
FIG. 7 is a block diagram illustrating a first network node according to an embodiment.

FIG. 7 illustrates an embodiment of a first network node 110, configured for wireless communication in a wireless communication system 100. The first network node 110 is further configured for performing the method 600 according to at least some of the previously described actions 601-602 for providing timing information concerning at least one other network node 120, operating in discontinuous transmission mode, for enabling a mobile station 130 to monitor the at least one other network node 120 according to any of the described method actions 601-602. The at least one other network node 120 may comprise a plurality of other network nodes 120-0, 120-1, 120-2 in some embodiments. Further, the transmitted signal may be mobile station specific, or mobile stations group specific in different embodiments.

The timing information may in some embodiments comprise an indication of residual time in dormant state of the at least one other network node 120. Further, the timing information may comprise the number of discovery signal bursts left prior to the activation of the at least one other network node 120 in some embodiments. The timing information may furthermore comprise an indication of periodicity of the discovery signal bursts of said at least one other network node 120. Also, the timing information may comprise one or a set of estimates of potential residual times in dormant state of the at least one other network node 120. In addition, the timing information may comprise a starting time and/or stopping time for the mobile station 130 to start/stop monitoring the at least one other network node 120, operating in discontinuous transmission mode. Additionally, the timing information may comprise a single bit, triggering the mobile station 130 to start and/or stop monitoring the at least one other network node 120 in some embodiments. Also, the timing information further may comprise one or a set of time-lags, each time-lag indicating a delay upon which the mobile station 130 may start monitoring the at least one other network node 120. In some embodiments, the timing information may further comprise at least one time window for monitoring the at least one other network node 120.

For enhanced clarity, any internal electronics or other components of the first network node 110, not completely indispensable for understanding the herein described embodiments have been omitted from FIG. 7.

The first network node 110 comprises a transmitter 730, configured for transmitting a signal comprising timing information, associated with a state switch between dormant state and active state of the at least one other network node 120 and/or associated to a monitoring operation of the at least one other network node 120, to be received by the mobile station 130.

Further, the first network node 110 may comprise a processor 720, configured for obtaining timing information, associated with the state switch between dormant state and active state of the at least one other network node 120, according to some embodiments.

Such processor 720 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

In further addition, the first network node 110 may comprise a receiver 710, configured for receiving signals from other network nodes 120 and/or the mobile station 130 over a wired or wireless interface according to some embodiments.

Furthermore, the first network node 110 may further comprise at least one memory 725, according to some embodiments. The optional memory 725 may comprise a physical device utilised to store data or programs, i.e., sequences of instructions, on a temporary or permanent basis. According to some embodiments, the memory 725 may comprise integrated circuits comprising silicon-based transistors. Further, the memory 725 may be volatile or non-volatile.

The above described actions 601-602 to be performed in the first network node 110 may be implemented through the one or more processors 720 in the first network node 110, together with computer program product for performing at least some of the functions of the actions 601-602. Thus a computer program comprising program code may perform a method 600 according to any, at least some, or all of the functions of the actions 601-602 for providing timing information from a first network node 110, concerning at least one other network node 120, operating in discontinuous transmission mode, for enabling a mobile station 130 to monitor the at least one other network node 120, when the computer program is loaded into a processor 720 of the first network node 110.

Further, a computer program product may comprise a computer readable storage medium storing program code thereon for use by a first network node 110, for providing timing information concerning at least one other network node 120, operating in discontinuous transmission mode, for enabling a mobile station 130 to monitor the at least one other network node 120, wherein the program code comprising instructions for executing a method 600 comprising: transmitting 602 a signal comprising timing information, associated with a state switch between dormant state and active state of the at least one other network node 120 and/or associated to a monitoring operation of the at least one other network node 120 to be received by the mobile station 130.

The computer program product mentioned above may be provided for instance in the form of a data carrier carrying computer program code for performing at least some of the actions 601-602 according to some embodiments when being loaded into the processor 720. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the first network node 110 remotely, e.g., over an Internet or an intranet connection.

Figure 8:
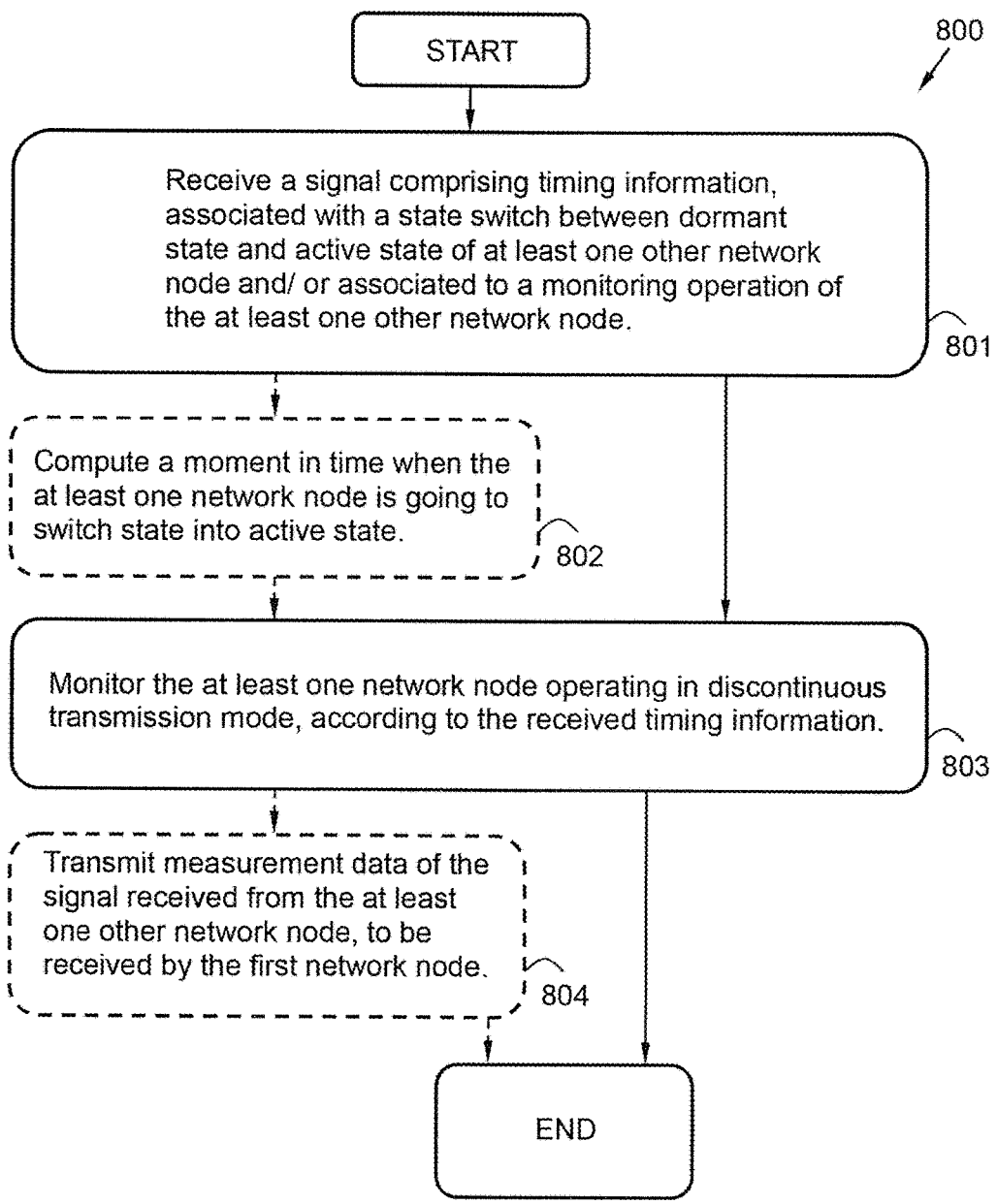
FIG. 8 is a flow chart illustrating a method in a mobile station according to an embodiment.

FIG. 8 is a flow chart illustrating embodiments of a method 800 for use in a mobile station 130 for, based on timing information received from a first network node 110, monitoring at least one other network node 120, operating in discontinuous transmission mode.

To appropriately monitor the at least one other network node 120, the method 800 may comprise a number of actions 801-804.

It is however to be noted that any, some or all of the described actions 801-804, may be performed in a somewhat different chronological order than the enumeration indicates, be performed simultaneously or even be performed in a completely reversed order according to different embodiments. Also, some actions such as e.g. actions 802 and/or 804 may be performed only within some alternative embodiments. Further, it is to be noted that some actions may be performed in a plurality of alternative manners according to different embodiments, and that some such alternative manners may be performed only within some, but not necessarily all embodiments. The method 800 may comprise the following actions:

Action 801

A signal comprising timing information, associated with a state switch between dormant state and active state of the at least one other network node 120 and/or associated to a monitoring operation of the at least one other network node 120 is received. The signal is received from the first network node 110.

The timing information may comprise an indication of residual time in dormant state of the at least one other network node 120 in some embodiments. Further, in some embodiments, the timing information may comprise the number of discovery signal bursts left prior to the activation of the at least one other network node 120. According to some embodiments, the timing information may further comprise an indication of periodicity of the discovery signal bursts of the at least one other network node 120.

Further, in some embodiments, the timing information may comprise a set of estimates of potential residual times in dormant state of the at least one other network node 120.

In some embodiments, the timing information may comprise an indication of residual time in dormant state of the at least one other network node 120; the number of discovery signal bursts left prior to the activation of the at least one other network node 120; an indication of periodicity of the discovery signal bursts of the at least one other network node 120 and/or one or a set of estimates of potential residual times in dormant state of the at least one other network node 120.

Thus, in some embodiments, the mobile station 130 may compute when the other network node 120 is going to switch into active mode, based in the received information, by knowing the number of discovery signal bursts left prior to the activation and/or the periodicity of the discovery signal bursts of the at least one other network node 120. However, in other embodiments, the mobile station 130 may compute the periodicity of the discovery signal bursts of the at least one other network node 120 by own calculations.

However, in some embodiments, the timing information may comprise a starting time and/or stopping time for the mobile station 130 to start/stop monitoring the at least one other network node 120, operating in discontinuous transmission mode. Thus, according to some such embodiments, the signal comprising the timing information may function as a trigger for the mobile station 130 to start/stop the monitoring. An advantage with such embodiments is that less computation has to be made by the mobile station 130, thereby saving processing resources and battery capacity of the mobile station 130. The timing information may comprise a single bit, triggering the mobile station 130 to start and/or stop monitoring the at least one other network node 120. Thus the mobile station 130 may start monitoring the at least one other network node 120 when receiving a bit set to 1, or alternatively when the received bit is set to 0. Further, in some embodiments, the mobile station 130 may stop monitoring the at least one other network node 120 when receiving a bit set to 0, or alternatively when the received bit is set to 1. An advantage with these embodiments, triggering the mobile station 130 to start/stop monitoring by transmitting one single bit is that little additional radio traffic is required. Thus signalling overhead may be required.

Furthermore, the timing information may further comprise one or a set of time-lags, each time-lag indicating a delay upon which the mobile station 130 may start monitoring the at least one other network node 120. An advantage with some such embodiments is that the first network node 110 may transmit the signal comprising the timing information, not exactly at the moment when the mobile station 130 may start monitoring the at least one other network node 120, but at any other previous convenient moment in time. Also, the first network node 110 may transmit a plurality of triggering signals for enabling the mobile station 130 to start monitoring different other network nodes 120, possibly at different moments in time.

Furthermore, the timing information may comprise at least one time window for monitoring the at least one other network node 120.

The transmitted signal maybe mobile station specific; or mobile stations group specific in some embodiments.

Furthermore, the signal may be transmitted as part of a physical downlink control channel, such as PDCCH and/or EPDCCH in some embodiments. Also, in some embodiments, the signal may be transmitted by using physical downlink shared channel, such as PDSCH; or higher layer RRC signalling.

Action 802

This action may be performed within some, but not necessarily all possible embodiments.

A moment in time may be computed, when the at least one other network node 120 is going to switch state into active state, based on the received 801 timing information, in some embodiments.

Action 803

At least one other network node 120 operating in discontinuous transmission mode is monitored by the mobile station 130, based on the timing information received 801 from the first network node 110.

The monitoring may be initiated at the computed 802 moment in time, according to some embodiments comprising action 802.

Further, the monitoring of the at least one other network node 120 may comprise measuring a signal received from the at least one other network node 120.

Thus the monitoring of the other network node 120 operating in DTX mode may comprise detecting the presence of said one other network node; performing measurements (e.g., RRM/RLM measurements) based on downlink signals transmitted by the other network node 120 in DTX mode; and reporting said measurements of discovery signals from the mobile station 130 to said first network node 110. Measurements of signals transmitted by the other network node 120 in DTX mode may comprise one or more in the group of: Reference Signal Received Power (RSRP), Reference Signal Received Quality (RSRQ), Channel State Information (CSI), Channel Quality Indicators (CQI), Signal to Noise and Interference Ratio (SINR), Signal to Noise Ratio (SNR), Signal to Interference Ratio (SIR), Signal to Noise plus Interference Ratio (SNIR), or any other appropriate measurement reflecting the strength and/or quality of a signal, and/or a ratio between a certain desired signal and undesired interference or noise. Thereby, the first network node 110 may trigger the monitoring operation of a mobile station 130 associated to at least other network node 120, operating in discontinuous transmission mode. In further addition, the action of monitoring may comprise reporting the made measurements of discovery signals from the mobile station 130 to the first network node 110.

Action 804

This action may be performed within some, but not necessarily all possible embodiments.

Measurement data of a signal received from the at least one other network node 120 may be transmitted, to be received by the first network node 110. Thereby, the first network node 110 may utilise the measurements of the signal received by the mobile station 130 from the other network node 120 e.g. for determining to hand over the mobile station 130 to the other network node 120 according to a hand over algorithm.

Figure 9:
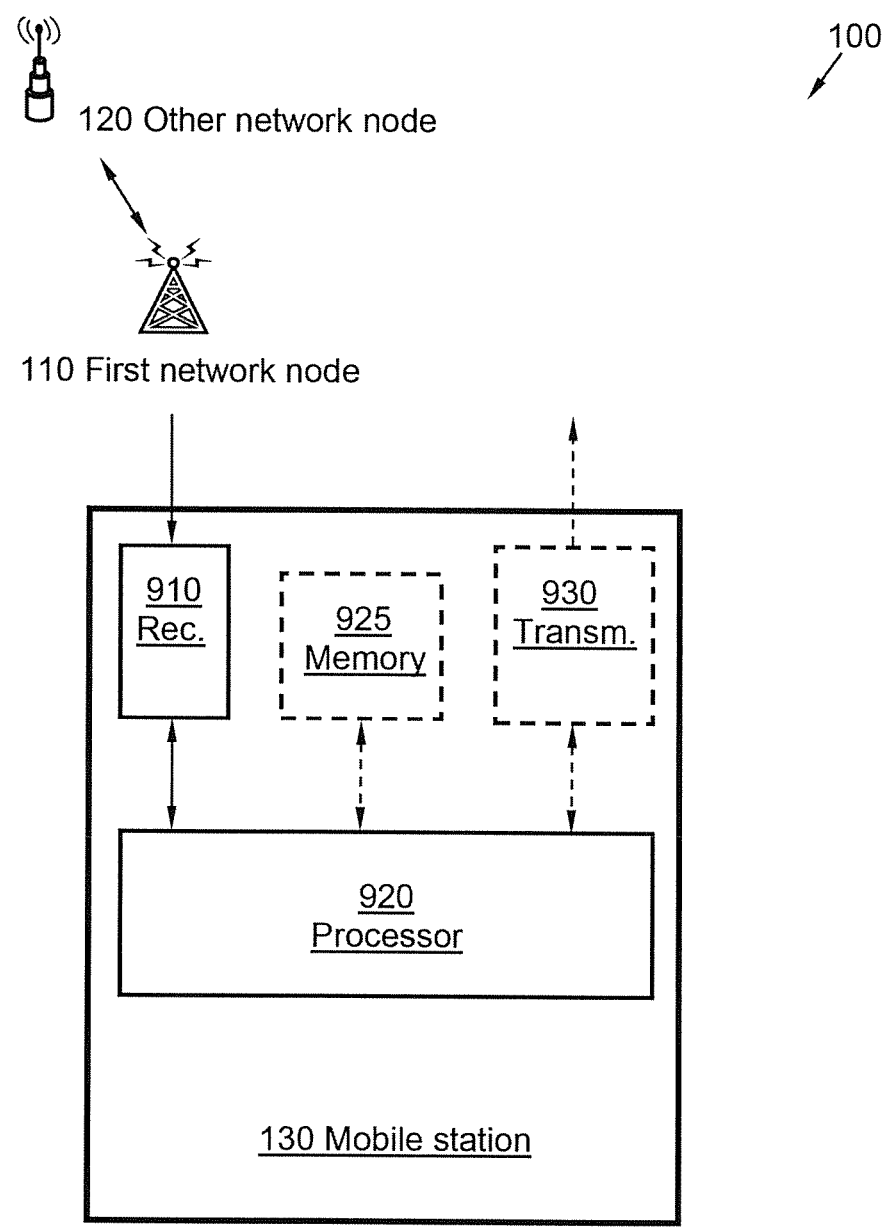
FIG. 9 is a block diagram illustrating a mobile station according to an embodiment.

FIG. 9 illustrates an embodiment of a mobile station 130, configured for monitoring at least one other network node 120, operating in discontinuous transmission mode, based on timing information received from a first network node 110.

The mobile station 130 is configured for performing the method 800 according to at least some of the previously described actions 801-803 for monitoring at least one other network node 120, operating in discontinuous transmission mode.

For enhanced clarity, any internal electronics or other components of the mobile station 130, not completely indispensable for understanding the herein described embodiments have been omitted from FIG. 9.

The mobile station 130 comprises a receiver 910, configured for receiving a signal comprising timing information, associated with a state switch between dormant state and active state of the at least one other network node 120 and/or associated to a monitoring operation of the at least one other network node 120.

The receiver 910 may be configured for receiving wired signals, or alternatively radio signals over a wireless interface. The signals may be received from, e.g., the first network node 110, the other network node 120, or any other entity configured for communication within the wireless communication system 100, according to some embodiments.

In addition, the mobile station 130 also comprises a processor 920, configured for monitoring the at least one other network node 120 operating in discontinuous transmission mode, according to the received timing information. Further, according to some embodiments, the processor 920 may be configured for computing a moment in time when the at least one other network node 120 is going to switch state into active state, based on the received timing information, and also configured to initiate the monitoring of the other network node 120 at the computed moment in time.

The processor 920 may further be configured for measuring a signal received from the at least one other network node 120.

Such processor 920 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

Furthermore, the mobile station 130 also may comprise a transmitter 930, configured for transmitting a wireless signal e.g. comprising signal measurements. Such signal may be transmitted over a wired interface, or over a wireless interface according to different embodiments. The transmitter 930 may be configured for transmitting measurement data of the signal received from the at least one other network node 120, to be received by the first network node 110, in some embodiments.

Furthermore, the mobile station 130 may further comprise at least one memory 925, according to some embodiments. The optional memory 925 may comprise a physical device utilised to store data or programs, i.e., sequences of instructions, on a temporary or permanent basis. According to some embodiments, the memory 925 may comprise integrated circuits comprising silicon-based transistors. Further, the memory 925 may be volatile or non-volatile.

The above described actions 801-804 to be performed in the mobile station 130 may be implemented through the one or more processors 920 in the mobile station 130, together with computer program product for performing at least some of the functions of the actions 801-804. Thus a computer program product, comprising instructions for performing the actions 801-804 in the mobile station 130 may perform a method 800 comprising at least some of the method actions 801-804, for monitoring at least one other network node 120, operating in discontinuous transmission mode, based on timing information received from a first network node 110, when the computer program is loaded into a processor 920 of the mobile station 130.

Thus a computer program product comprising a computer readable storage medium storing program code thereon for use by a mobile station 130 for, based on timing information received from a first network node 110, monitor at least one other network node 120, operating in discontinuous transmission mode. The program code may comprise instructions for executing a method 800 comprising: receiving 801 a signal comprising timing information, associated with a state switch between dormant state and active state of the at least one other network node 120 and/or associated to a monitoring operation of the at least one other network node 120. Also, the method 800 comprises monitoring 803 the at least one other network node 120 operating in discontinuous transmission mode, based on the received 801 timing information.

The computer program product mentioned above may be provided for instance in the form of a data carrier carrying computer program code for performing at least some of the actions 801-804 according to some embodiments when being loaded into the processor 920 of the mobile station 130. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the mobile station 130 remotely, e.g., over an Internet or an intranet connection.

The terminology used in the description of the embodiments as illustrated in the accompanying drawings is not intended to be limiting of the described methods 600, 800; first network node 110 and/or mobile station 130. Various changes, substitutions and/or alterations may be made, without departing from the invention as defined by the appended claims.

As used herein, the term "and/or" comprises any and all combinations of one or more of the associated listed items. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

What is claimed is:

1. A first network node for providing timing information concerning at least one other network node, operating in discontinuous transmission mode, for enabling a mobile station to monitor the at least one other network node, the first network node comprising:
   a memory storing instructions; and
   a processor coupled to the memory for executing the instructions to cause the first network node to:
      transmit a signal comprising timing information, associated with a state switch between a dormant state and an active state of the at least one other network node and/or associated to a monitoring operation of the at least one other network node, to be received by the mobile station, wherein the timing information further comprises a set of estimates of potential residual times in dormant state of the at least one other network node.

2. The first network node according to claim 1, wherein the instructions further cause the first network node to:
   obtain timing information, associated with the state switch between a dormant state and an active state of the at least one other network node.

3. A first network node for providing timing information concerning at least one other network node, operating in discontinuous transmission mode, for enabling a mobile station to monitor the at least one other network node, the first network node comprising:
   a memory storing instructions; and
   a processor coupled to the memory for executing the instructions to cause the first network node to:
      transmit a signal comprising timing information, associated with a state switch between a dormant state and an active state of the at least one other network node and/or associated to a monitoring operation of the at least one other network node, to be received by the mobile station, wherein the timing information comprises a number of discovery signal bursts left prior to the activation of the at least one other network node.

4. The first network node according to claim 3, wherein the timing information further comprises an indication of periodicity of the discovery signal bursts of the at least one other network node.

5. The first network node according to claim 1, wherein the timing information further comprises a starting time and/or a stopping time for the mobile station to start/stop monitoring the at least one other network node, operating in discontinuous transmission mode.

6. The first network node according to claim 1, wherein the timing information further comprises a single bit for triggering the mobile station to start and/or stop monitoring the at least one other network node.

7. A first network node for providing timing information concerning at least one other network node, operating in discontinuous transmission mode, for enabling a mobile station to monitor the at least one other network node, the first network node comprising:
a memory storing instructions; and
a processor coupled to the memory for executing the instructions to cause the first network node to:
transmit a signal comprising timing information, associated with a state switch between a dormant state and an active state of the at least one other network node and/or associated to a monitoring operation of the at least one other network node, to be received by the mobile station, wherein the timing information further comprises a set of time-lags, each time-lag indicating a delay upon which the mobile station shall start monitoring the at least one other network node.

8. The first network node according to claim 1, wherein the timing information further comprises at least one time window for monitoring the at least one other network node.

9. The first network node according to claim 1, wherein the at least one other network node comprises a plurality of other network nodes.

10. The first network node according to claim 1, wherein the transmitted signal is mobile station specific or mobile stations group specific.

11. A method for use with a first network node for providing timing information of at least one other network node, operating in discontinuous transmission mode, for enabling a mobile station to monitor the at least one other network node, the method comprising:
transmitting a signal comprising timing information, associated with a state switch between a dormant state and an active state of the at least one other network node and/or associated to a monitoring operation of the at least one other network node to be received by the mobile station, wherein the timing information further comprises a set of estimates of potential residual times in dormant state of the at least one other network node.

12. The method according to claim 11, further comprising:
obtaining timing information, associated with the state switch between the dormant state and the active state of the at least one other network node.

13. A mobile station for monitoring at least one other network node, operating in discontinuous transmission mode, based on timing information received from a first network node, the mobile station comprising:
a receiver, configured to receive a signal comprising timing information, associated with a state switch between a dormant state and an active state of the at least one other network node and/or associated to a monitoring operation of the at least one other network node, wherein the timing information further comprises a set of estimates of potential residual times in dormant state of the at least one other network node; and
a processor, configured to monitor the at least one other network node operating in discontinuous transmission mode, according to the received timing information.

14. The mobile station according to claim 13, wherein the processor is further configured to:
compute a first moment in time when the at least one other network node is going to switch state into the active state, based on the received timing information; and
compute a second moment in time when the monitoring is initiated.

15. The mobile station according to claim 13, wherein:
the processor is further configured to measure a signal received from the at least one other network node, based on the timing information received from the first network node; and
the mobile station further comprises:
a transmitter, configured to transmit measurement data of the signal received from the at least one other network node, to be received by the first network node.

16. A method for use with a mobile station for, based on timing information received from a first network node, monitoring at least one other network node, operating in discontinuous transmission mode, the method comprising:
receiving a signal comprising timing information, associated with a state switch between a dormant state and an active state of the at least one other network node and/or associated to a monitoring operation of the at least one other network node, wherein the timing information further comprises a set of estimates of potential residual times in dormant state of the at least one other network node; and
monitoring the at least one other network node operating in discontinuous transmission mode, based on the received timing information.

17. The method according to claim 16, further comprising:
computing a first moment in time when the at least one other network node is going to switch state into the active state, based on the received timing information; and
computing a second moment in time when the monitoring is initiated.

18. The method according to claim 16, wherein:
monitoring of the at least one other network node comprises measuring a signal received from the at least one other network node; and
the method further comprises:
transmitting measurement data of the signal received from the at least one other network node, to be received by the first network node.

* * * * *